United States Patent
Tanabe et al.

(10) Patent No.: US 8,568,603 B2
(45) Date of Patent: Oct. 29, 2013

(54) METHOD OF MANUFACTURING TRANSPARENT CONDUCTIVE FILM

(75) Inventors: Mari Tanabe, Ibaraki (JP); Hidehiko Andou, Ibaraki (JP); Hideo Sugawara, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 13/593,858

(22) Filed: Aug. 24, 2012

(65) Prior Publication Data

US 2013/0048597 A1 Feb. 28, 2013

(30) Foreign Application Priority Data

Aug. 24, 2011 (JP) .................................. 2011-182733

(51) Int. Cl.
*C30B 33/00* (2006.01)
(52) U.S. Cl.
USPC .................. 216/23; 216/24; 216/13
(58) Field of Classification Search
USPC .................. 216/23, 24, 13; 438/694
See application file for complete search history.

(56) References Cited

U.S. PATENT DOCUMENTS

| 2008/0138589 A1 | 6/2008 | Wakabayashi et al. |
| 2008/0176042 A1 | 7/2008 | Nashiki et al. |
| 2011/0135892 A1 | 6/2011 | Nashiki et al. |
| 2011/0141059 A1 | 6/2011 | Nashiki et al. |
| 2011/0143105 A1 | 6/2011 | Nashiki et al. |
| 2011/0147340 A1 | 6/2011 | Nashiki et al. |
| 2013/0048348 A1* | 2/2013 | Yamazaki et al. ............ 174/254 |

FOREIGN PATENT DOCUMENTS

| JP | 2008-098169 A | 4/2008 |
| JP | 2009-076432 A | 4/2009 |
| JP | 4364938 B1 | 11/2009 |
| JP | 2010-015861 A | 1/2010 |
| JP | 2010-21137 A | 1/2010 |

OTHER PUBLICATIONS

Korean Notice of Allowance dated Jul. 17, 2013, issued in corresponding Korean Patent Application No. 10-2012-0092214, w/English translation.

* cited by examiner

*Primary Examiner* — Roberts Culbert
(74) *Attorney, Agent, or Firm* — Westerman, Hattori, Daniels & Adrian, LLP

(57) ABSTRACT

A method of manufacturing a transparent conductive film has the steps of: preparing a laminated body in which a transparent conductive layer that is not patterned is formed on a flexible transparent base, removing a part of the transparent conductive layer to form the pattern forming part having the transparent conductive layer on the flexible transparent base and the pattern opening part not having the transparent conductive layer on the flexible transparent base, and heating the laminated body in which the transparent conductive layer is patterned. The absolute value of the difference $H_1 - H_2$ of the dimensional change rate $H_1$ of the pattern forming part and the dimensional change rate $H_2$ of the pattern opening part in the heat treatment step is preferably less than 0.03%.

5 Claims, 3 Drawing Sheets

METHOD OF MANUFACTURING TRANSPARENT CONDUCTIVE FILM

BACKGROUND OF THE INVENTION

1. Field of the Invention

The present invention relates to a method of manufacturing a transparent conductive film having a transparent conductive layer on one surface of a flexible transparent base.

2. Description of the Related Art

A transparent conductive film that is used for a touch panel, etc. has been conventionally known in which a transparent conductive layer made of a conductive metal oxide such as ITO is laminated on a flexible transparent base such as a transparent film. In recent years, a projection capacitive touch panel in which a multipoint input (multi touch) is acceptable and a matrix resistive film type touch panel have been attracting attention. In these types of touch panels, a transparent conductive layer of the transparent conductive film is patterned into a prescribed shape such as a stripe shape. Such a transparent conductive film has a pattern forming part having a transparent conductive layer on a flexible transparent base and a pattern opening part having no transparent conductive layer on a flexible transparent base.

When the transparent conductive layer is patterned, the pattern may be visible and the appearance of the display element may become bad due to a difference in the reflectance between the part where the transparent conductive layer is formed (the pattern forming part) and the part where the transparent conductive layer is not formed (the pattern opening part). From the viewpoint of suppressing the difference of visibility due to the presence or absence of the transparent conductive layer, it has been proposed in JP-A-2010-15861, JP-A-2008-98169, JP-B1-4364938, and JP-A-2009-76432 that a plurality of optical interference layers are provided between the film base and the transparent conductive layer as an undercoat layer to adjust the refractive index of the optical interference layer, etc. in a prescribed range.

SUMMARY OF THE INVENTION

When the transparent conductive layer is patterned, it is required that its boundary is less apt to be visible. In addition to this, a thinner transparent conductive film that is used for a touch panel, etc. is required from the viewpoint of making the display device lighter and thinner. In order to decrease the thickness of the transparent conductive film, it is necessary to decrease the thickness of the film base that takes up most of the thickness of the transparent conductive film. However, from the investigation of the present inventors, it is found that, in the case of thin film base, the pattern boundary of the transparent conductive layer is easily visible and the appearance may become bad when the transparent conductive film is assembled into a touch panel even when optical interference layers are provided between the base and the transparent conductive layer.

In consideration of the above mentioned matters, an objective of the present invention is to provide a transparent conductive film in which the pattern of the transparent conductive layer is less apt to be visible when the transparent conductive film is assembled into a touch panel even in the case that the thickness of the base is small (80 µm or less).

As a result of the investigation of the present inventors, it is found that if the difference in the dimensional change rate between the pattern forming part and the pattern opening part is made to be small in the heat treatment step that is performed after the transparent conductive layer of the transparent conductive film is patterned, thereby the pattern of the transparent conductive layer is less apt to be visible; and the present invention is completed.

The present invention relates to a method of manufacturing a transparent conductive film having a patterned transparent conductive layer on a flexible transparent base having a thickness of 80 µm or less. The transparent conductive film has a pattern forming part having the transparent conductive layer on the flexible transparent base and a pattern opening part not having the transparent conductive layer on the flexible transparent base. The manufacturing method of the present invention has a laminated body preparing step of preparing a laminated body in which a transparent conductive layer that is not patterned is formed on a flexible transparent base having a transparent film base, a patterning step of removing a part of the transparent conductive layer to form the pattern forming part having the transparent conductive layer on the flexible transparent base and the pattern opening part not having the transparent conductive layer on the flexible transparent base, and a heart treatment step of heating the laminated body in which the transparent conductive layer is patterned.

In the present invention, the absolute value of the difference $H_1$-$H_2$ between the dimensional change rate $H_1$ of the pattern forming part and the dimensional change rate $H_2$ of the pattern opening part in the heat treatment step is preferably small. Specifically, $H_1$-$H_2$ is preferably less than 0.03%, more preferably 0.025% or less, further preferably 0.02% or less, and especially preferably 0.015% or less.

In one embodiment, the temperature in the step of heating the laminated body in which the transparent conductive layer is patterned is preferably less than 100° C.

In one embodiment of the present invention, a part of the transparent conductive layer is preferably removed by wet etching using an etchant. In this case, the laminated body is preferably heated and dried in the heat treatment step.

In one embodiment of the present invention, the flexible transparent base has an undercoat layer formed on the side of the transparent film base where the transparent conductive layer is formed. The transparent conductive layer is preferably made of tin-doped indium oxide, and a polyethylene terephthalate film is preferably used as the transparent film base of the flexible transparent base.

According to the present invention, in the transparent conductive film after the transparent conductive layer is patterned, the difference in the dimensional change rate between the pattern forming part and the pattern opening part at heating is in a prescribed range. Because of that, the stress that occurs at the interface between the transparent conductive layer and the flexible transparent base is small even after heating, and waviness is hardly generated on the film. When the obtained transparent conductive film is bonded to a stiff base body such as a glass plate to form a touch panel, etc., the level difference is reduced at the pattern boundary and deterioration of the appearance due to the pattern boundary becoming visible is suppressed.

DETAILED DESCRIPTION OF THE PREFERRED EMBODIMENTS

Figure 1:
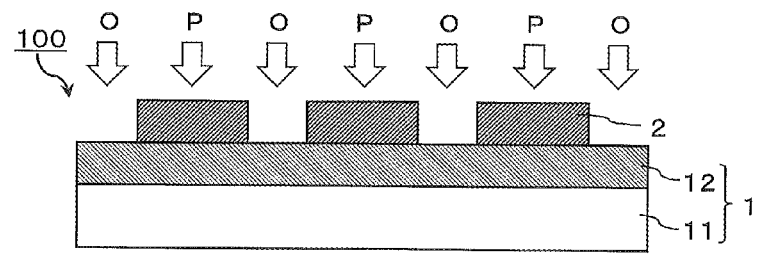
FIG. 1 is a schematic sectional view showing the transparent conductive film in which the transparent conductive layer is patterned.
Figure 2:
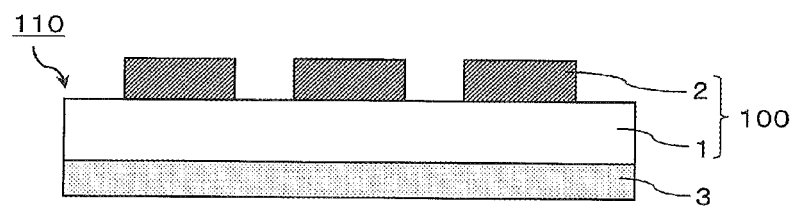
FIG. 2 is a sectional view showing one embodiment of the transparent conductive film with a pressure-sensitive adhesive layer.
Figure 3:
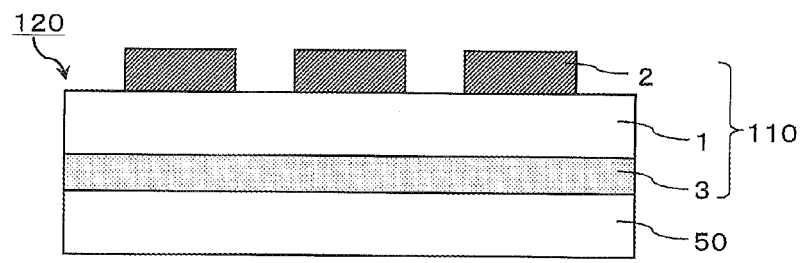
FIG. 3 is a schematic sectional view showing a configuration in which the transparent conductive film is bonded to another base body.

FIG. 1 is a schematic sectional view showing one embodiment of the transparent conductive film having a patterned transparent conductive layer. A transparent conductive film 101 shown in FIG. 1 has a patterned transparent conductive layer 2 on one surface of a flexible transparent base 1. In the flexible transparent base, an undercoat layer 12, etc. is formed on the surface of a transparent film base 11 as necessary. The transparent conductive film 101 includes a pattern forming part P where the transparent conductive layer 2 is formed and a pattern opening part O where the transparent conductive layer is not formed. FIG. 2 is a schematic sectional view showing one embodiment of the transparent conductive film with a pressure-sensitive adhesive layer having a pressure-sensitive adhesive layer 3 on the surface of the flexible transparent base 1 where the transparent conductive layer 2 is not formed. FIG. 3 is a schematic sectional view showing a transparent conductive film 110 with a pressure-sensitive adhesive layer in which the transparent conductive film is bonded to a stiff base body 50 such as glass with the pressure-sensitive adhesive layer 3 interposed therebetween.

Figure 5:
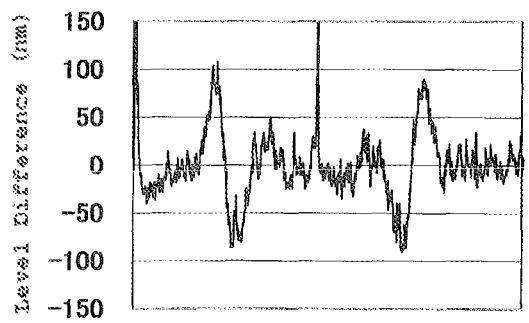
FIG. 5 is a drawing showing one example of a measurement result of a surface shape (the level difference) at the pattern boundary.

First, the inventors have investigated the cause of making the pattern boundary of the transparent conductive layer 2 of the transparent conductive film having the above-described configuration easily visible when the thickness of the flexible transparent base 1 is made small. One example of a profile of the surface shape of the side of the transparent conductive layer is shown in FIG. 5 when the transparent conductive film 101 in which the patterned transparent conductive layer 2 made of ITO is formed on the flexible transparent base 1 including the PET film base having a thickness of 23 μm is bonded to a glass plate 50 with the pressure-sensitive adhesive layer 3 interposed therebetween. In FIG. 5, a height difference (a level difference) of 150 nm or more is generated at the boundary of the pattern forming part P where the transparent conductive layer is formed and the pattern opening part O where the transparent conductive layer is not formed. In this example, the height difference at the pattern boundary is larger by far than the thickness (22 nm) of the transparent conductive layer, and this level difference is considered to be a cause of making the pattern boundary easily visible.

Figure 6A:
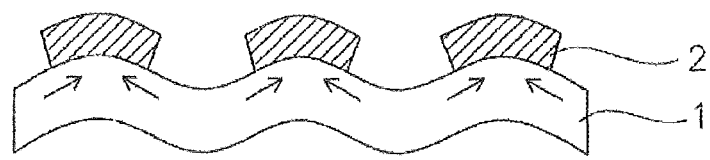
FIG. 6A is a drawing for conceptually explaining the generation of the level difference at the pattern boundary when the transparent conductive film is bonded to the base body.
Figure 6B:
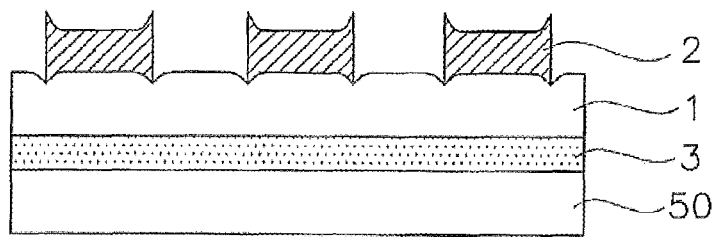
FIG. 6B is a drawing for conceptually explaining the generation of the level difference at the pattern boundary when the transparent conductive film is bonded to the base body.

From further investigation of the cause of a large level difference being generated at the pattern boundary of the transparent conductive film that is bonded to a glass plate, it is found that waviness is generated with convex on the side of the pattern forming part P where the transparent conductive layer 2 is formed in the transparent conductive film before it is bonded to the glass plate as conceptually shown in FIG. 6A. When this wavy film is bonded to a flat glass plate with the pressure-sensitive adhesive layer interposed therebetween, the waviness of the film is almost relieved and becomes flat because the stiffness of the glass plate is larger than that of the film. When the waviness of the transparent conductive film is relieved and becomes flat, a strain is concentrated at the boundary part of the pattern forming part P that is curved convexly. Therefore, the transparent conductive layer is raised in the vicinity of the edge boundary, and this is estimated to be a cause of generating the level difference at the boundary as conceptually shown in FIG. 6B. In FIGS. 3 and 6B, a configuration is shown in which the side of the flexible transparent base 1 of the transparent conductive film 100 is bonded to the stiff base body with the pressure-sensitive adhesive layer 3 interposed therebetween. However, it is considered that the level difference is generated at the pattern boundary due to the waviness of the film and the pattern boundary becomes easily visible even when the side of the transparent conductive layer 2 is bonded to another base body (for example, a window layer of a touch panel).

It is considered that, in order to relieve the level difference to make the pattern boundary less apt to be visible, it is important to relieve the waviness of the transparent conductive film before it is bonded to a stiff base body such as glass. The cause of generating the waviness in the transparent conductive film has been further investigated, and it is found that the waviness can be easily generated when the film is heated after the transparent conductive layer is patterned by etching, etc. In general, after the transparent conductive layer is patterned by wet etching, the etchant is washed, and then it is heated to be dried. When the transparent conductive layer is amorphous, the transparent conductive layer may be heated under an oxygen atmosphere to be crystallized for the purpose of improving thermal reliability and transparency of the transparent conductive layer, and making the resistance low. The heating is also performed when a patterned wiring is formed on the transparent conductive film to electrically connect the transparent conductive layer to a control means such as an IC, etc. and when the film is assembled into a touch panel.

The present invention is based on a proposed principle in which the level difference is decreased when the transparent conductive film is bonded to a stiff base body such as a glass plate and the pattern boundary is less apt to be visible when the generation of waviness is suppressed in a heat treatment step after the transparent conductive layer is patterned. As a result of further investigation, it is found that, in a heating step after the transparent conductive layer is patterned, the generation of the waviness is suppressed when the dimensional change rate $H_1$ of the pattern forming part and the dimensional change rate $H_2$ of the pattern opening part are substantially equal to each other, and that the pattern boundary is less apt to be visible even when the film is bonded to glass, etc.

An embodiment of the present invention will be explained below by referring to the drawings. FIG. 1 is a schematic sectional view of the transparent conductive film according to one embodiment. The transparent conductive film 100 is shown in FIG. 1 in which the transparent conductive layer 2 is formed on the flexible transparent base 1. As the flexible transparent base 1, one is shown in FIG. 1 that the undercoat layer 12 is formed on the film base 11; however, the flexible transparent base 1 may not have the undercoat layer. A functional layer (not shown in the drawings) such as a hard coat layer, a blocking preventing layer, and a reflection preventing layer, may be formed on the side of the film base 11 where the transparent conductive layer 2 is not formed.

<Flexible Transparent Base>
(Film Base)

The transparent film base 11 that configures the flexible transparent base 1 is not especially limited. However, various plastic films having transparency can be used. Examples of film materials include a polyester-based resin, an acetate-based resin, a polyethersulfone-based resin, a polycarbonate-based resin, a polyamide-based resin, a polyimide-based resin, a polyolefin-based resin, a (meth)acrylic-based resin, a polyvinyl chloride-based resin, a polyvinylidene chloride-based resin, a polystyrene-based resin, a polyvinyl alcohol-based resin, a polyarylate-based resin, and a polyphenylene sulfide-based resin. Among these, a polyester-based resin, a polycarbonate-based resin, and a polyolefin-based resin are especially preferable. Here, when the member represented with a reference numeral "1" (that is, a flexible transparent base) in, for example, FIG. 1 is configured with only a transparent film base 11, the member is also referred to as a flexible transparent base.

From the viewpoint that the waviness and the level difference are less apt to be generated on the transparent conductive film, it is preferable to make the thickness of the base film large to increase the stiffness. However, the thickness of the base film of the present invention is 80 µm or less from the viewpoint of making the film thinner. When an undercoat layer 12 such as an optical interference layer and a hard coat layer is formed on the film base 11 as described later, the thickness of the flexible transparent base including those is preferably 80 µm or less.

From the viewpoint of making the film thinner, the thickness of the film base is preferably small. However, when the thickness is excessively small, a problem occurs such as deterioration of handling properties. Therefore, the thickness of the film base is preferably 10 µm or more. The present invention is suitable even when the thickness of the film base is as thin as 10 to 60 µm and further 10 to 30 µm. When the film base is made as thin as in the above-described range, the total thickness of the transparent conductive film becomes small. In addition, the amount of volatile components that are generated from the inside of the film base can be made small to form a transparent conductive layer having fewer defects when the transparent conductive layer is formed by sputtering, etc.

The film base preferably has high dimensional stability during heating. Generally, the dimensional change is easily generated in a plastic film due to expansion or shrinkage when the film is heated. Contrary to this, a strain is generated at the interface between the flexible transparent base and the transparent conductive layer when the dimensional change is generated in the base film after heating, because the dimensional change of the transparent conductive layer made of a metal oxide is hardly generated. This causes generation of the waviness. Because of that, the base film preferably has a high thermal deformation temperature.

An etching treatment such as sputtering, corona discharge, blazing, ultraviolet ray irradiation, electron beam irradiation, chemical conversion, and oxidation and an undercoating treatment may be performed in advance on the surface of the transparent film base. With this, the adhesion of the transparent conductive layer or the undercoat layer or the like that is formed on the transparent film base 11 to the base can be improved. Before the transparent conductive layer or the undercoat layer or the like is provided, dust on the surface of the film base may be removed to clean the surface by cleaning with a solvent, ultrasonic waves, etc. as necessary.

The transparent film base can be used as the flexible transparent base 1 as it is. However, the undercoat layer 12 such as a hard coat layer, a blocking preventing layer, and an optical interference layer may be provided on the side of the transparent film base 11 where the transparent conductive layer 2 is formed.

(Undercoat Layer)

In general, the hard coat layer is provided to give hardness to the film to prevent scratches, and the blocking preventing layer is provided to form unevenness on the film surface to give slipperiness and blocking resistance. The optical interference layer is provided to reduce the difference in the reflectance between the pattern forming part and the pattern opening part of the transparent conductive layer to prevent the pattern from being visible.

Examples of the resin that forms the hard coat layer include a thermosetting resin, a thermoplastic resin, an ultraviolet-ray curing-type resin, an electron-beam curing-type resin, and a two-liquid mixing-type resin. Among these, an ultraviolet-ray curing-type resin is preferable because the hard coat layer can be formed effectively with a simple process operation in the curing treatment by ultraviolet-ray irradiation. Examples of the ultraviolet-ray curing-type resin include various types of resins such as a polyester-based resin, an acrylic-based resin, a urethane-based resin, an amide-based resin, a silicone-based resin, and an epoxy-based resin, and include ultraviolet-ray curing-type monomer, oligomer, polymer, etc. Examples of the preferred ultraviolet-ray curing-type resin are resins having an ultraviolet-ray polymerizable functional group, and among these resins, preferred are resins having two or more of such functional groups, especially resins containing acrylic-based monomer and oligomer components having 3 to 6 of such functional groups. An ultraviolet-ray polymerization initiator is compounded in the ultraviolet-ray curing-type resin.

The method of forming the hard coat layer is not especially limited, and an appropriate method can be adopted. For example, a method can be adopted in which a resin composition for forming the hard coat layer is applied on the transparent film 11 and then it is dried to be cured. The application of the resin composition is performed with an appropriate method such as fountain, die coater, casting, spin coat, fountain metering, and gravure. The resin composition is preferably diluted with a general solvent such as toluene, ethyl acetate, butyl acetate, methyl ethyl ketone, methy lisobutyl ketone, isopropyl alcohol, and ethyl alcohol in advance to be used in the application.

The hard coat layer is provided to give hardness to the film to prevent scratches. In the present invention, it can also contribute to the suppression of the dimensional change by heating of the flexible transparent base. That is, because the hard coat layer generally has a crosslinking structure, a dimensional change of the hard coat layer is hardly generated compared to the transparent film base 11, and the dimensional change by heating of the flexible transparent base in which the hard coat layer is formed on the film base is small compared to the case of only the film base without the hard coat layer. Because of that, the hard coat layer is provided as the undercoat layer 12 on the transparent film base 11 to suppress the dimensional change of the flexible transparent base, and the hard coat layer can contribute to reduction of the generation of waviness when the transparent conductive film in which the transparent conductive layer 2 is patterned is heated.

The thickness of the hard coat layer is preferably 1 to 7 µm, and more preferably 2 to 5 µm. When the thickness of the hard coat layer is small, the hardness may become insufficient and the effect of suppressing the dimensional change as described above may not be exhibited sufficiently. When the thickness is excessively large, problems may occur such that curling of the flexible transparent base and the transparent conductive film occurs and that cracking of the hard coat layer occurs.

The hard coat layer may have a function as the blocking preventing layer. If the hard coat layer has a function as the blocking preventing layer, the arithmetic average roughness Ra on its surface is preferably 50 nm or more. By setting the arithmetic average roughness in the above mentioned range, the transparent conductive film can be given a good slipperiness and a blocking resistance.

As such a blocking preventing layer, a layer where fine particles are contained in a curing-type resin layer, a layer obtained by using a coating composition containing two or more ingredients capable of causing phase separation as a curing-type resin composition, or a layer of which surface has irregularities obtained by using these together is preferably used. The same ingredients as those of the hard coat layer are preferably used as ingredients of the curing-type resin layer. As the coating composition containing two or more ingredients capable of causing phase separation, for example, a composition described in the International Publication WO2005/073763 can preferably be used.

The optical interference layer is provided to reduce the difference in the reflectance between the pattern forming part wherein the transparent conductive layer is formed and the pattern opening part where the transparent conductive layer is removed by adjusting the difference in the optical thickness between the two parts, so that the pattern is less apt to be visible.

(Optical Interference Layer)

The optical interference layer can be formed of an inorganic substance, an organic substance, or a mixture of inorganic and organic substances. Examples of the inorganic substance include NaF (1.3), $Na_3AlF_6$ (1.35), LiF (1.36), $MgF_2$ (1.38), $CaF_2$ (1.4), $BaF_2$ (1.3), $SiO_2$ (1.46), $LaF_3$ (1.55), $CeF_3$ (1.63), and $Al_2O_3$ (1.63), where the number in the parentheses of each material is the refractive index. Among these, $SiO_2$, $MgF_2$, $Al_2O_3$, etc. can be preferably used. Especially, $SiO_2$ is suitable. Besides the above-described materials, a complex oxide containing about 10 to 40 parts by weight of cerium oxide and about 0 to 20 parts by weight of tin oxide to indium oxide can be used.

Examples of the organic substance include an acrylic resin, a urethane resin, a melamine resin, an alkyd resin, a siloxane-based polymer, and an organic silane condensate. At least one type of these organic substances can be used. Especially, a thermosetting type resin made of a mixture of a melamine resin, an alkyd resin, and an organic silane condensate is desirably used as the organic substance.

The optical interference layer can be provided between the transparent film base 11 and the transparent conductive layer 2, and it does not function as a conductive layer. The optical interference layer is provided as a dielectric layer that insulates between the transparent film base 11 and the patterned transparent conductive layer 2. Therefore, the surface resistance of the optical interference layer is normally $1 \times 10^6 \Omega/\square$ or more, preferably $1 \times 10^7 \Omega/\square$ or more, and more preferably $1 \times 10^8 \Omega/\square$ or more. The upper limit of the surface resistance of the optical interference layer is not especially limited. The upper limit of the surface resistance of the optical interference layer is generally the measurement limit. It is about $1 \times 10^{13} \Omega/\square$. However, it may exceed $1 \times 10^{13} \Omega/\square$.

The difference between the refractive index of the optical interference layer and the refractive index of the transparent conductive layer 2 is preferably 0.1 or more. The difference between the refractive index of the transparent conductive layer and the refractive index of the optical interference layer is preferably 0.1 to 0.9, and more preferably 0.1 to 0.6. The refractive index of the optical interference layer is normally 1.3 to 2.5, preferably 1.38 to 2.3, and more preferably 1.4 to 2.3. The refractive index of the optical interference layer is controlled to decrease the difference in the reflectance between the pattern forming part and the pattern opening part.

The optical interference layer that is closest to the transparent film base 11 is preferably formed of an organic substance from the viewpoint of patterning the transparent conductive layer by etching. Because of that, the optical interference layer is preferably formed of an organic substance when the optical interference layer consists of one layer.

When the optical interference layer consists of two layers or more, the optical interference layer that is farthest from the transparent film base is at least preferably formed of an inorganic substance from the viewpoint of patterning the transparent conductive layer by etching. When the optical interference layer consists of three layers or more, the optical interference layers that are at the second layer or above from the film base are preferably also formed of an inorganic substance.

The optical interference layer made of an inorganic substance can be formed by a dry process such as a vacuum vapor deposition method, a sputtering method, and an ion plating method; by a wet method (a coating method); etc. The inorganic substance that forms the optical interference layer is preferably $SiO_2$. A silica sol, etc. can be applied to form a $SiO_2$ film with a wet method.

When the optical interference layer is provided, the first optical interference layer is preferably formed of an organic substance and the second optical interference layer is preferably formed of an inorganic substance.

The thickness of the optical interference layer is not especially limited. However, it is normally about 1 to 300 nm, and preferably 5 to 300 nm from respects of an optical design and an effect of preventing the generation of an oligomer from the transparent film base. When the optical interference layer consists of two layers or more, the thickness of each layer is preferably about 5 to 250 nm, and more preferably 10 to 250 nm.

The optical interference layer may be provided directly on the base film or may be provided on the hard coat layer or on the blocking preventing layer. The optical interference layer can also contribute to the suppression of the dimensional change by heating of the flexible transparent base in the same way as the hard coat layer. However, the hard coat layer is more excellent in the effect of suppressing the dimensional change by heating than the optical interference layer because the thickness of the optical interference layer is generally smaller than that of the hard coat layer. Because of that, the hard coat layer can be provided on the transparent film base, and then the optical interference layer can be provided on top of that to also suppress the difference in the reflectance between the pattern forming part and the pattern opening part while suppressing the dimensional change of the flexible transparent base.

<Transparent Conductive Layer>

The transparent conductive layer 2 is formed of a conductive metal oxide. The conductive metal oxide that constitutes the transparent conductive layer is not especially limited, and a conductive metal oxide of at least one type of metal selected from the group consisting of indium, tin, zinc, gallium, antimony, titanium, silicon, zirconium, magnesium, aluminum, gold, silver, copper, palladium, and tungsten is used. The metal oxide may further contain metal atoms shown in the above-described group as necessary. For example, tin-doped indium oxide (ITO), antimony-doped tin oxide (ATO), etc.

can be preferably used. Among these, ITO is most suitable. When the optical interference layer is formed on the surface of the transparent conductive layer 2 side of the flexible transparent base, the difference in the refractive index between the transparent conductive layer and the optical interference layer is preferably 0.1 or more.

The thickness of the transparent conductive layer is not especially limited. However, it is preferably 10 nm or more, more preferably 15 to 40 nm, and further preferably 20 to 30 nm. When the thickness of the transparent conductive layer is 15 nm or more, a good continuous film having a surface resistance of $1\times10^3 \Omega/\square$ or less can be easily obtained. When the thickness of the transparent conductive layer 2 is 40 nm or less, a layer having high transparency can be obtained.

The method of forming the transparent conductive layer is not especially limited, and a conventionally known method can be adopted. Specific examples are a vacuum deposition method, a sputtering method, and an ion plating method. An appropriate method can be adopted depending on the film thickness that is necessary. The transparent conductive layer may be of amorphous or crystalline. As a method for forming a crystalline transparent conductive layer, a crystalline film can be also formed as it is on the flexible transparent base 1 at high temperature. However, considering the heat resistance, etc. of the base, it is preferable that an amorphous film is formed on the base first, and the amorphous film is annealed and crystallized together with the flexible transparent base to form the crystalline transparent conductive layer.

The crystallization of the transparent conductive layer can be performed either before or after the transparent conductive layer is patterned. When the transparent conductive layer is patterned by wet etching, etching may become difficult if the crystallization of the transparent conductive layer is performed before etching. Therefore, the crystallization of the transparent conductive layer is preferably performed after the transparent conductive layer is patterned. When the crystallization is performed after the transparent conductive layer is patterned, the annealing conditions are preferably set so that the dimensional change rates of the pattern forming part and the pattern opening part become small as described later.

<Patterning of the Transparent Conductive Layer>

Figure 4:
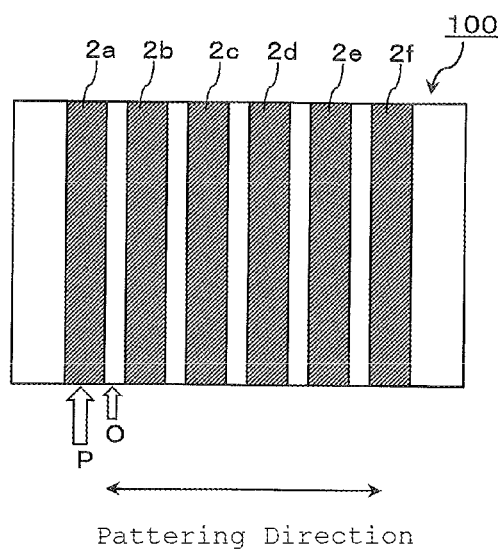
FIG. 4 is a schematic planar view showing one embodiment of the transparent conductive film in which the transparent conductive layer is patterned.

A part of the transparent conductive layer of the laminated body in which the transparent conductive layer is formed on the flexible transparent base is removed to be patterned. The transparent conductive film in which the transparent conductive layer is patterned has a pattern forming part P where the transparent conductive layer 2 is on the flexible transparent base 1 and a pattern opening part O where the transparent conductive layer is not on the flexible transparent base 1. Various pattern shapes can be formed depending on the use to which the transparent conductive film is applied. Examples of the shape of the pattern forming part P include a stripe shape shown in FIG. 4 and a square shape. FIG. 4 shows that the width of the pattern forming part P is larger than that of the pattern opening part O. However, the present invention is not limited to this embodiment.

The transparent conductive layer 2 is preferably patterned by wet etching. When a part of the transparent conductive layer 2 is removed by wet etching to be patterned, a part (the pattern forming part) of the transparent conductive layer 2 is covered with a mask for forming a pattern, and a part of the transparent conductive layer that is not covered with the mask (the pattern opening part) is exposed to an etchant to be removed. Because a conductive metal oxide such as ITO and ATO is used for the transparent conductive layer 2, acid is used suitably for the etchant. Examples of the acid include inorganic acid such as hydrogen chloride, hydrogen bromide, sulfuric acid, nitric acid, and phosphoric acid, organic acid such as acetic acid, mixtures of these, and solutions of these.

<Heat Treatment>

A heat treatment step is performed on the transparent conductive film in which the transparent conductive layer is patterned. Examples of the heat treatment include heating to dry away a washing liquid such as water that is used to wash the etchant that is used for patterning, annealing to crystallize the amorphous transparent conductive layer, heating to dry a silver paste, etc. that is used when a patterned wiring is formed to electrically connect the patterned transparent conductive layer to a control means such as an IC, etc., and heating when the film is assembled into a touch panel.

In the present invention, the absolute value of the difference $H_1$-$H_2$ between the dimensional change rate $H_1$ of the pattern forming part P and the dimensional change rate $H_2$ of the pattern opening part O in the heat treatment step is preferably less than 0.03%. By reducing the difference of the dimensional change rate between the pattern forming part and the pattern opening part, the generation of waviness in the transparent conductive film can be suppressed. Because of that, deterioration of the appearance due to a large level difference at the pattern boundary is suppressed when the transparent conductive film is assembled into a touch panel. From the viewpoint of suppressing the generation of waviness to make the level difference at the pattern boundary small, the absolute value of $H_1$-$H_2$ is more preferably 0.025% or less, further preferably 0.02% or less, and especially preferably 0.015% or less.

The dimensional change rate (%) is defined by $100\times(L-L_o)/L_o$ where $L_o$ is a distance between two points before the heat treatment and L is the distance between two points after the heat treatment. When the dimensional change rate is positive, it represents expansion; and when it is negative, it represents shrinkage. Therefore, a negative $H_1$-$H_2$ means that the dimension after the heat treatment of the pattern opening part where the transparent conductive layer is removed is smaller than that of the pattern forming part where the transparent conductive layer is formed (easily susceptible to thermal shrinkage rate). When the dimensional change rate (thermal shrinkage) of the transparent conductive film differs depending on direction in the heat treatment step, the difference in the dimensional change rate in any one direction is preferably in the above-described range. When the transparent conductive layer is patterned in a stripe shape as shown in FIG. 4, the difference in the dimensional change rate in a patterning direction (the direction in which the patterns are lined up) is preferably in the above-described range.

A presumed principle will be explained below in which the waviness is suppressed when the difference in the dimensional change rate between the pattern forming part and the pattern opening part is small in the heat treatment step.

When the flexible transparent base 1 is heated at high temperature, a dimensional change can be easily generated in the pattern opening part after the transparent conductive layer is removed due to thermal expansion or shrinkage of the base film. When a biaxially stretched polyethylene terephthalate film is used as the transparent film base, thermal shrinkage of the base of the pattern opening part is generated when the transparent conductive film is heated at about 120° C., and the dimensional change rate $H_2$ generally becomes negative. On the other hand, the hardness of the transparent conductive layer 2 made of a metal oxide is high compared to the base film, and a dimensional change by heating is hardly generated. Because of that, the dimensional change of the flexible transparent base is suppressed in the pattern forming part where the transparent conductive layer 2 is formed on the flexible transparent base 1 due to the transparent conductive layer, and the absolute value of the dimensional change rate $H_1$ of the pattern forming part P tends to be smaller than that of the dimensional change rate $H_2$ of the pattern opening part O where the transparent conductive layer is removed.

The absolute value of the dimensional change rate $H_1$ in the pattern forming part P is smaller than that of $H_2$. However, a stress is generated at the interface between the flexible transparent base 1 and the transparent conductive layer 2, because the dimensional change of the base is suppressed due to the transparent conductive layer. On the other hand, a stress is not generated at the interface in the pattern opening part where the transparent conductive layer is not formed. Because of that, it is considered that corrugated waviness is generated in the transparent conductive film in which the transparent conductive layer is patterned in the state that the transparent conductive layer 2 side of the pattern forming part P becomes convex as conceptually shown in FIG. 6. FIG. 6 shows that the flexible transparent base is shrunk due to heating. However, it is considered that the waviness is generated in the state that the side where the transparent conductive layer 2 of the pattern forming part is not formed becomes convex if the flexible transparent base expands due to heating.

The small difference in the dimensional change rate between the pattern forming part and the pattern opening part means that the stress generated at the interface between the flexible transparent base and the transparent conductive layer is small. Therefore, it is considered that the generation of waviness is suppressed more as the absolute value of $H_1$-$H_2$ is smaller. It is considered that, when the waviness of the transparent conductive film is small, the level difference at the pattern boundary becomes small when it is bonded to a stiff base body such as a glass plate, and the pattern boundary becomes less apt to be visible.

A specific example of the heat treatment step will be explained below. A typical example of the heat treatment after the transparent conductive film is patterned is heating to dry away a washing liquid such as water that is used to wash the etchant that is used for patterning. Because a liquid containing water as a main component is generally used as the washing liquid, the heating to dry away the washing liquid is often performed at a high temperature of 100° C. or more. On the other hand, when the transparent conductive film after the transparent conductive layer is patterned is exposed to the heat treatment with such a high temperature, a dimensional change of the flexible transparent base is generated, and the difference in the dimensional change rate between the pattern forming part and the pattern opening part tends to become large. Because of that, the drying of the wash liquid is preferably performed at a low temperature of less than 100° C. The heating temperature at drying is preferably 90° C. or less and more preferably 80° C. or less.

When a flexible transparent base of which the dimensional change by heating is suppressed such as the flexible transparent base in which an undercoat layer such as a hard coat layer is formed on the surface of the film base is used, the absolute value of $H_1$-$H_2$ may be set to less than 0.03% to suppress the generation of waviness even when a higher temperature than the above-described range is used in heating. In such a case, the heating temperature of the heat treatment step can be appropriately set in a range where the absolute value of $H_1$-$H_2$ does not become 0.03% or more.

Other heat treatments include annealing to crystallize the amorphous transparent conductive layer, heating to dry a silver paste, etc. that is used when a patterned wiring is formed to electrically connect the patterned transparent conductive layer to a control means such as an IC, etc., and heating when the film is assembled into a touch panel. When these heat treatments are performed, the heating temperature can be adjusted to make the absolute value $H_1$-$H_2$ to be less than 0.03% in the same way as the drying of the washing liquid.

The transparent conductive film in which the transparent conductive layer 2 is patterned can be suitably used in a touch panel, etc. Because the transparent conductive layer is patterned to have a plurality of transparent electrodes, it is suitably used in a projection capacitive touch panel and a matrix resistive film type touch panel. When the film is applied to a touch panel, etc., a transparent conductive film with a pressure-sensitive adhesive layer may be formed as shown in FIG. 2 that has the pressure-sensitive adhesive layer 3 on the surface of the flexible transparent base 1 where the transparent conductive layer 2 is not formed. The transparent conductive film with a pressure-sensitive adhesive layer is bonded to the base body 50 with the pressure-sensitive adhesive layer 3 interposed therebetween as shown in FIG. 3. Even when a stiff base body such as a glass plate is used as the base body 50, the generation of the level difference at the pattern boundary is suppressed and a touch panel with excellent visibility can be formed if the waviness of the transparent conductive film is suppressed. When the pressure-sensitive adhesive layer is provided on the side where the transparent conductive layer 2 is provided and then it is bonded to another base body such as a window layer of the touch panel, the level difference at the pattern boundary is also suppressed. Therefore, a touch panel with excellent visibility can be also formed.

The pressure-sensitive adhesive layer 3 can be used without special limitation as long as it has transparency. Specifically, layers having an acrylic-based polymer, a silicone-based polymer, polyester, polyurethane, polyamide, polyvinylether, a vinylacetate/vinyl chloride copolymer, modified polyolefin, an epoxy-based polymer, a fluoro-based polymer, and a rubber-based polymer such as natural rubber and synthetic rubber as a base polymer can be appropriately selected and used. Especially, an acrylic pressure-sensitive adhesive can be preferably used from the respects that it has excellent optical transparency, it exhibits moderate wettability, cohesivity, and adhesion characteristics such as tackiness, and it has excellent weather resistance, heat resistance, etc.

There are some pressure-sensitive adhesives of which anchoring power to the base can be improved by using an appropriate undercoating agent for adhesion depending on the type of the pressure-sensitive adhesive that is a constituting material of the pressure-sensitive adhesive layer 3. Therefore, when such a pressure-sensitive adhesive is used, an undercoating agent for adhesion is preferably used on the flexible transparent base 1.

A crosslinking agent according to the base polymer can be contained in the pressure-sensitive adhesive layer. Appropriate additives can be compounded in the pressure-sensitive adhesive layer such as a filler made of natural and synthetic resins, glass fibers, glass beads, metal powder, and other inorganic powder, a pigment, a coloring agent, and an antioxidant as necessary. Transparent particles can be contained to give optical diffusivity to the pressure-sensitive adhesive layer 3.

The pressure-sensitive adhesive layer is used as a pressure-sensitive adhesive solution having a concentration of solid content of about 10 to 50% by weight in which the base polymer or its composition is dissolved or dispersed in a solvent. An organic solvent such as toluene and ethyl acetate, water, etc. can be appropriately selected and used as the solvent according to the type of the pressure-sensitive adhesive.

After this pressure-sensitive adhesive layer is adhered to a stiff base body such as glass or other plastic films, it can have a function of improving the scratch resistance, and tap properties for a touch panel, so-called pen input durability and surface pressure durability, in the transparent conductive layer 2 provided on one surface of the base 1 due to its cushioning effect. Because of that, the cushioning effect is preferably given to the pressure-sensitive adhesive layer especially when it is used in a matrix resistive film type touch panel. Specifically, the elastic modulus of the pressure-sensitive adhesive layer 3 is desirably set in a range of 1 to 100 $N/cm^2$, and the thickness is desirably set to 1 μm or more, normally in a range of 5 to 100 μm. When the thickness of the pressure-sensitive adhesive layer is in the above-described range, the cushioning effect can be sufficiently exhibited, and adhesive power by the pressure-sensitive adhesive layer can be also sufficient. When the thickness of the pressure-sensitive adhesive layer is smaller than the above-described range, the above-described durability and the adhesion cannot be sufficiently secured, and when it is larger than the above-described range, problems may occur in the outer appearance such as transparency. When the transparent conductive film is used in a capacitive touch panel, the cushioning effect by the pressure-sensitive adhesive layer is not necessarily desired. However, the pressure-sensitive adhesive layer 3 preferably has the same thickness and elastic modulus as described above from the viewpoints of the adhesion to various bases and facilitating handling of the transparent conductive film with a pressure-sensitive adhesive layer.

EXAMPLES

The present invention will be explained in detail using examples below. However, the present invention is not limited to the following examples as long as it does not exceed its gist. In the following examples, a measurement was performed on a film having a thickness of 1 μm or more with a microgauge type thickness meter manufactured by Mitutoyo Corporation. The thicknesses of the undercoat layer and the ITO film were calculated based on a waveform of the interference spectrum using a multi channel photo detector "MCPD2000" model manufactured by Otsuka Electronics Co., Ltd.

Example 1

Flexible Transparent Base

A biaxially stretched polyethylene terephthalate (PET) film (trade name "DIAFOIL" manufactured by Mitsubishi Plastics, Inc., refractive index 1.65) having a thickness of 23 μm as the transparent film base was used as the flexible transparent base as it was.
(Production of ITO Film)
A sintered body containing indium oxide and tin oxide at a weight ratio of 97:3 was mounted as a target material in a DC magnetron sputtering apparatus. The dehydration and degassing were performed while feeding the flexible transparent base. Then, an ITO film having a thickness of 22 nm was formed on the base by a DC sputtering method at a heating temperature of 100° C., with argon gas and oxygen gas introduced in the apparatus, and at a discharge output of 6.35 $mW/cm^2$.
(Patterning of ITO Film)
A rectangular-shaped test piece of 7 cm square was cut out from the obtained laminated body in which the ITO film was formed as the transparent conductive layer on the flexible transparent base, and a plurality of polyimide tapes of 2 mm wide were bonded onto the surface of the ITO film at an interval of 2 mm. At this time, the tapes were bonded in the direction (hereinafter "TD direction") perpendicular to the direction of the feeding (hereinafter "MD direction") in the sputter film production so that the MD direction became a patterning direction. This test piece was soaked in a 5 wt % hydrochloric acid solution heated to 50° C. for 10 minutes to perform an etching treatment on the non-masking part (the part where the polyimide tapes were not bonded) of the transparent conductive layer. The test piece in which the transparent conductive layer was removed was washed by soaking it in a sufficient amount of pure water, and the polyimide tapes were slowly peeled off.
(Heat Treatment)
The patterned transparent conductive film was heated in an oven at 70° C. for 5 minutes and dried.
(Evaluation of the Level Difference)
The obtained transparent conductive film in which the ITO film was patterned was bonded to a glass plate with an acrylic-based pressure-sensitive adhesive layer of 22 μm thick interposed therebetween using a hand roller with the ITO film face up. The ITO film forming surface of the sample was scanned at a cutoff value of 0.8 mm and a speed of 0.2 mm/sec using a fine shape measuring machine (model "ET4000") manufactured by Kosaka Laboratory, Ltd. to measure the level difference at the boundary between the pattern forming part where the transparent conductive layer was formed and the pattern opening part where the transparent conductive layer was removed. Whether the pattern forming part and the pattern opening part could be distinguished or not was visibly evaluated. The visual distance was 20 cm, and the visual angle was 40 degrees from the surface of the sample.
(Measurement of Dimensional Change Rate at Heat Treatment)
The laminated body where the transparent conductive layer was formed was considered to be the pattern forming part, and the laminated body where the transparent conductive layer was removed by etching was considered to be the pattern opening part to measure the dimensional change rate of each part when the same heating as the above described heat treatment was performed.
(1) Dimensional Change Rate of the Pattern Forming Part
A rectangular-shaped test piece of 7 cm square was cut out from the laminated body in which the ITO film was formed as the transparent conductive layer on the flexible transparent base, and it was soaked in pure water at 50° C. for 10 minutes. Two target points (scratches) were formed on the flexible transparent base at an interval of about 50 mm in the patterning direction (MD direction), and then it was heated at 70° C. for 5 minutes in the same way as the above-described heat treatment. The distance between targets $L_o$ before heating and the distance between targets $L$ after heating were measured with a surface coordinates measuring machine (model "CP600S") manufactured by TOPCON Corporation to obtain the dimensional change rate $H_1$ of the pattern forming part=$100×(L-L_o)/L_o$ (%).
(2) Dimensional Change Rate of Pattern Opening Part
A rectangular-shaped test piece of 7 cm square was cut out from the laminated body in which the ITO film was formed as the transparent conductive layer on the flexible transparent base, and it was soaked in a 5 wt % hydrochloric acid solution heated to 50° C. for 10 minutes to remove the ITO film in the same way as described in the "Patterning of ITO film." Then, it was subjected to the heat treatment in the same way as described for the pattern forming part. The dimensional change rate $H_2$ before and after the heating was measured.

Example 2

A thermosetting rein composition containing a melamine resin: an alkyd resin: an organic silane condensate at a weight ratio of 2:2:1 in solid content was diluted with methyl ethyl ketone so that the concentration of solid content became 8% by weight. This solution was applied onto one surface of the same PET film having a thickness of 23 μm as the film used in Example 1, it was heated and cured at 150° C. for 2 minutes to form an optical interference layer (refractive index: 1.54) having a thickness of 33 nm. This optical interference layer is referred to as "an undercoat layer A." A transparent conductive film was produced and the evaluation was performed in the same way as Example 1 except that the PET film on which the undercoat layer A was formed was used as the flexible transparent base to form the ITO film on the side where the undercoat layer was formed.

Example 3

An optical interference layer that had a thickness of 50 nm and a refractive index of 1.6 to 1.9, and was made of $SiO_x$ ($x$ is 1.5 or more and less than 2) was formed on one surface of the same PET film having a thickness of 23 μm as used in Example 1. This optical interference layer is referred to as "an undercoat layer B." A transparent conductive film was produced and the evaluation was performed in the same way as Example 1 except that the PET film on which the undercoat layer B was formed was used as the flexible transparent base to form the ITO film on the side where the undercoat layer was formed and that the heating temperature was 120° C. and the heating time was 5 minutes in the heat treatment step.

Example 4

To 100 parts by weight of an acrylic urethane-based resin (trade name "UNIDIC17-806" manufactured by DIC Corporation) was added 5 parts by weight of hydroxycyclohexylphenylketone (trade name "IRGACURE 184" manufactured by Ciba-Geigy Corporation) as a photopolymerization initiator, and these were diluted with toluene to prepare a hard coat application solution of 30% by weight in solid content. This solution was applied onto one surface of the same PET film having a thickness of 23 μm as the film used in Example 1, and it was heated and dried at 100° C. for 3 minutes. Then, ultraviolet-ray irradiation (integrated intensity 300 mJ/cm$^2$) was performed with two ozone-type high pressure mercury lamps (energy density 80 W/cm$^2$, 15 cm concentrated) to form a hard coat layer having a thickness of 2 μm. This hard coat layer is referred to as "an undercoat layer C." A transparent conductive film was produced and the evaluation was performed in the same way as Example 1 except that the PET film on which the undercoat layer C was formed was used as the flexible transparent base to form the ITO film on the side where the undercoat layer was formed and that the heating temperature was 160° C. and the heating time was 5 minutes in the heat treatment step.

Example 5

The undercoat layer A was formed on one surface of a biaxially stretched polyethylene terephthalate film (trade name "DIAFOIL" manufactured by Mitsubishi Plastics, Inc., refractive index 1.65) having a thickness of 50 μm in the same way as Example 2. A transparent conductive film was produced and the evaluation was performed in the same way as Example 1 except that this PET film was used as the flexible transparent base to form the ITO film on the side where the undercoat layer was formed and that the heating temperature was 160° C. and the heating time was 5 minutes in the heat treatment step.

Example 6

The laminated body in which the ITO film was formed on the flexible transparent base was formed in the same way as Example 1. In patterning of the ITO film, the direction in which the polyimide tape was bonded was changed, and the ITO film was patterned in the TD direction. A transparent conductive film was produced and the evaluation was performed in the same way as Example 1 except that the dimensional change rate was obtained in the TD direction.

Comparative Example 1

A transparent conductive film was produced and the evaluation was performed in the same way as Example 1 except that the heating temperature was 120° C. and the heating time was 5 minutes in the heat treatment step.

Comparative Example 2

A transparent conductive film was produced and the evaluation was performed in the same way as Example 1 except that the heating temperature was 160° C. and the heating time was 5 minutes in the heat treatment step.

Comparative Example 3

A transparent conductive film was produced and the evaluation was performed in the same way as Example 2 except that the heating temperature was 120° C. and the heating time was 5 minutes in the heat treatment step.

Comparative Example 4

A transparent conductive film was produced and the evaluation was performed in the same way as Example 2 except that the heating temperature was 160° C. and the heating time was 5 minutes in the heat treatment step.

Comparative Example 5

A transparent conductive film was produced and the evaluation was performed in the same way as Example 3 except that the heating temperature was 160° C. and the heating time was 5 minutes in the heat treatment step.

Comparative Example 6

A transparent conductive film was produced and the evaluation was performed in the same way as Example 6 except that the heating temperature was 160° C. and the heating time was 5 minutes in the heat treatment step.

The conditions of producing the transparent conductive film and the evaluation results of each example and comparative example are shown in Table 1. For visual evaluation of the pattern, results based on the following 3 grades are shown.

◯: The pattern forming part and the pattern opening part can hardly be distinguished.

Δ: The pattern forming part and the pattern opening part can slightly be distinguished.

x: The pattern forming part and the pattern opening part can clearly be distinguished.

TABLE 1

| | Base | | | Evaluation | |
|---|---|---|---|---|---|
| | Thickness (μm) | Undercoat Layer | Patterning Direction | $H_1-H_2$ (%) | Level Difference (nm) | Visual Evaluation |
| Example 1 | 23 | — | MD | −0.01 | 125 | ○ |
| Example 2 | 23 | A | MD | 0.00 | 100 | ○ |
| Example 3 | 23 | B | MD | −0.02 | 145 | ○ |
| Example 4 | 23 | C | MD | −0.01 | 85 | ○ |
| Example 5 | 50 | A | MD | −0.02 | 105 | ○ |
| Example 6 | 23 | — | TD | −0.01 | 84 | ○ |
| Comparative Example 1 | 23 | — | MD | −0.04 | 175 | X |
| Comparative Example 2 | 23 | — | MD | −0.05 | 250 | X |
| Comparative Example 3 | 23 | A | MD | −0.03 | 160 | Δ |
| Comparative Example 4 | 23 | A | MD | −0.04 | 200 | X |
| Comparative Example 5 | 23 | B | MD | −0.03 | 160 | Δ |
| Comparative Example 6 | 23 | — | TD | −0.03 | 154 | Δ |

As seen from Table 1, when the absolute value of $H_1-H_2$ is less than 0.03%, the level difference at the pattern boundary becomes small and the pattern boundary is less apt to be visible. From comparison of Example 1 and Comparative Examples 1 and 2, comparison of Example 2 and Comparative Examples 3 and 4, and comparison of Example 3 and Comparative Example 5, the level difference is suppressed more as the absolute value of $H_1-H_2$ in the heat treatment step becomes smaller if the bases are the same.

TABLE 2

| | Base | | | Heat Treatment Conditions | | | Evaluation | |
|---|---|---|---|---|---|---|---|---|
| | Thickness (μm) | Undercoat Layer | Patterning Direction | Temperature (°C.) | Time | $H_1-H_2$ (%) | Level Difference (nm) | Visual Evaluation |
| Example 1 | 23 | — | MD | 70 | 5 | −0.01 | 125 | ○ |
| Example 2 | 23 | A | MD | 70 | 5 | 0.00 | 100 | ○ |
| Example 6 | 23 | — | TD | 70 | 5 | −0.01 | 84 | ○ |
| Comparative Example 1 | 23 | — | MD | 120 | 5 | −0.04 | 175 | X |
| Comparative Example 2 | 23 | — | MD | 160 | 5 | −0.05 | 250 | X |
| Comparative Example 3 | 23 | A | MD | 120 | 5 | −0.03 | 160 | Δ |
| Comparative Example 4 | 23 | A | MD | 160 | 5 | −0.04 | 200 | X |
| Comparative Example 6 | 23 | — | TD | 120 | 5 | −0.03 | 154 | Δ |

As seen from Table 2, when the heating temperature in the heat treatment step is less than 100° C., the absolute value of $H_1-H_2$ is suppressed to less than 0.03%, the level difference at the pattern boundary becomes small and the pattern boundary is less apt to be visible. From comparison of Example 1 and Comparative Examples 1 and 2, comparison of Example 2 and Comparative Examples 3 and 4, and comparison of Example 6 and Comparative Example 6, the level difference is suppressed more as the heating temperature in the heat treatment step is lower if the bases are the same.

Figure 7:
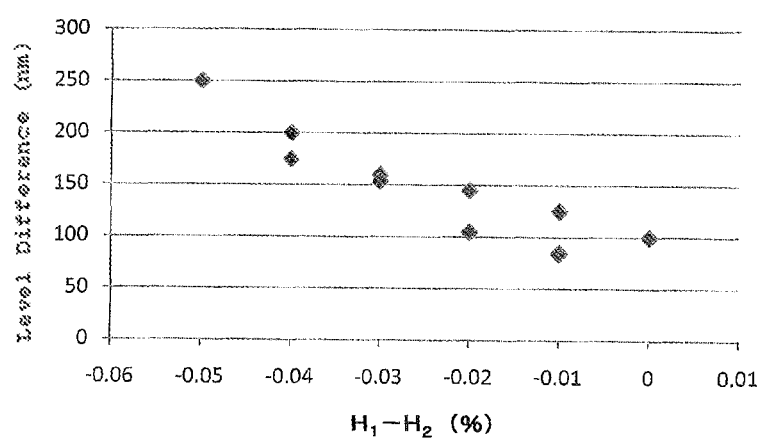
FIG. 7 is a plot showing the relationship between the value of ($H_1$-$H_2$) and the level difference at the pattern boundary in the examples and comparative examples.

FIG. 7 is a plot of the level difference at the pattern boundary to $H_1-H_2$ of each of the examples and comparative examples. According to FIG. 7, the level difference becomes larger as the absolute value of $H_1-H_2$ becomes larger, and the value of $H_1-H_2$ and the level difference are highly correlated to each other regardless of the thickness of the base, the type of the undercoat layer, and the pattering direction of the transparent conductive layer. Therefore, the level difference is decreased and the pattern boundary becomes less apt to be visible when $H_1-H_2$ is set in a prescribed range.

What is claimed is:

1. A method of manufacturing a transparent conductive film having a patterned transparent conductive layer on one surface of a flexible transparent base having a transparent film base, the transparent conductive film having a pattern forming part having the transparent conductive layer on the flexible transparent base and a pattern opening part not having the transparent conductive layer on the flexible transparent base, the flexible transparent base having a thickness of 80 μm or less; comprising the steps of:
   preparing a laminated body in which a transparent conductive layer that is not patterned is formed on a flexible transparent base,
   removing a part of the transparent conductive layer to form the pattern forming part having the transparent conductive layer on the flexible transparent base and the pattern opening part not having the transparent conductive layer on the flexible transparent base, and
   heating the laminated body in which the transparent conductive layer is patterned; wherein
   the absolute value of the difference $H_1-H_2$ between the dimensional change rate $H_1$ of the pattern forming part and the dimensional change rate $H_2$ of the pattern opening part in the heat treatment step is less than 0.03%.

2. The method of manufacturing a transparent conductive film according to claim 1, wherein
   a part of the transparent conductive layer is removed by wet etching using an etchant, and
   the laminated body is heated and dried in the heat treatment step.

3. The method of manufacturing a transparent conductive film according to claim 1, wherein the flexible transparent base has an undercoat layer formed on the side of the transparent film base where the transparent conductive layer is formed.

4. The method of manufacturing a transparent conductive film according to claim 1, wherein the transparent conductive layer is made of tin-doped indium oxide.

5. The method of manufacturing a transparent conductive film according to claim 1, wherein a polyethylene terephthalate film is used as the transparent film base of the flexible transparent base.

* * * * *